(12) United States Patent
Martin et al.

(10) Patent No.: US 7,127,171 B2
(45) Date of Patent: Oct. 24, 2006

(54) ARCHITECTURAL ARRANGEMENT FOR BANDWIDTH MANAGEMENT IN LARGE CENTRAL OFFICES

(75) Inventors: David Wright Martin, Nepean (CA); Xinyi Liu, Nepean (CA); Malcolm Betts, Kanata (CA); Bogdan Jakobik, Nepean (CA); Sarto Barsetti, Aylmer (CA); Mark Acton Gibbon, London (GB)

(73) Assignee: Nortel Networks Limited, St. Laurent (CA)

( * ) Notice: Subject to any disclaimer, the term of this patent is extended or adjusted under 35 U.S.C. 154(b) by 188 days.

(21) Appl. No.: 10/252,543

(22) Filed: Sep. 24, 2002
(Under 37 CFR 1.47)

(65) Prior Publication Data

US 2003/0113115 A1 Jun. 19, 2003

Related U.S. Application Data

(63) Continuation of application No. 09/166,895, filed on Oct. 6, 1998, now abandoned.

(51) Int. Cl.
*H04J 14/02* (2006.01)
(52) U.S. Cl. .......................... 398/83; 398/82; 398/59; 398/50

(58) Field of Classification Search ................ 370/535, 370/420, 376, 351; 359/124, 119, 117; 398/70, 398/2, 7, 48, 82, 83, 59, 50; 710/62
See application file for complete search history.

(56) References Cited

U.S. PATENT DOCUMENTS

| | | | | |
|---|---|---|---|---|
| 5,586,115 A | * | 12/1996 | Nakano et al. | ............. 370/376 |
| 5,959,986 A | * | 9/1999 | Nelson et al. | ............. 370/351 |
| 5,983,294 A | * | 11/1999 | Kim et al. | ................. 710/62 |
| 6,046,833 A | * | 4/2000 | Sharma et al. | ............. 398/48 |
| 6,195,367 B1 | * | 2/2001 | Jakobik et al. | ............. 370/535 |
| 6,542,267 B1 | * | 4/2003 | Nicholson | ................... 359/119 |
| 2002/0135835 A1 | * | 9/2002 | Lauder et al. | ............. 359/124 |

\* cited by examiner

*Primary Examiner*—David C. Payne

(57) ABSTRACT

The virtually unused switching fabric of an OC-192 SONET transport node is used to greater effect when used as a switching node. Several of the nodes are used in the central office (CO) of a communication network. Each node terminates an optical network link and each node hosts a number of transport cards that also terminate different optical network links. The nodes provide space-switching between the cards. Additionally an intra-CO optical link is provided that interconnects the nodes to allow traffic flow between any of the optical network links in the CO that are terminated by transport cards or the nodes.

17 Claims, 6 Drawing Sheets

ARCHITECTURAL ARRANGEMENT FOR BANDWIDTH MANAGEMENT IN LARGE CENTRAL OFFICES

This application is a continuation of U.S. patent application Ser. No. 09/166,895 filed Oct. 6, 1998, now abandoned in the name Martin et al.

FIELD OF THE INVENTION

This invention pertains generally to the field of bandwidth management in high-capacity communication networks, and particularly to the problem of managing the large amounts of bandwidth flowing through the central offices of such network.

BACKGROUND OF THE INVENTION

Vital to any telecommunication network is the manner in which its busiest points manage great quantities of bandwidth. These points usually occur at large central offices (COs). At COs, enormous amounts of traffic must be switched between enormous numbers of possible input or output links of varying data capacities.

Space-switches are vital to achieving this function, since they interconnect the large numbers of input and output links that converge at a CO. Presently, these space-switches are typically implemented using digital cross-connect (DCS) technology. DCS switches switch signals that are in electrical form and that conform to one of a set of digital signal formatting protocols. The highest capacity signal that can be switched by a DCS switch complies with the DS3 protocol, which supports a data rate of 44.736 MBPS. DCS switches capable of supporting this maximum rate are referred to as DCS 3/3 switches, and are widely used in large COs.

With the emergence of optical fibres as the principal transport medium for carrying telecommunication signals from point to point, the exclusive use of DCS space-switches is rapidly becoming an undesirable means by which to space-switch large quantities of traffic within very busy COs. This is firstly because the signals sent through fibre optic media are in optical form rather than in electrical form, which means that the use of DCS switches to guide a signal from an optical input link to an optical output link mandates intermediate equipment between the DCS switch and the transport switch terminating such optical links, that convert the signals from an optical form to an electrical form for switching purposes, and then back to an optical form for transport purposes. Such equipment requires additional cabling, power and space, and adds complexity to the CO and its components.

A second reason why the use of DCS switches is becoming unsuitable for space-switching in busy COs, is because the ports of such switches have not been cheaply adapted to switch individual signals at rates higher than the rate supported by the DS3 protocol (44.736 MBPS). This is a problem because all optical signals comply with protocols, such as the Synchronous Optical Network (SONET) protocols, which call for rates many times greater than 44.736 MBPS. The limit on the per-port throughput of DCS switches means that the only way to use such a switch to space-switch a signal at a rate exceeding 44.736 MBPS, is by demultiplexing the high rate signal down to several DS3 signals for switching purposes, switching the DS3 signals on the DCS 3/3 switch, and then remultiplexing the DS3 signals back into a single higher-rate signal for transport purposes. Like the first problem, this mandated practice also requires additional resources for, and adds increased complexity to, the CO and its components.

Even more significantly, this limitation in the per-port rates supported by DCS switches places limits on the total bandwidth that can be managed by a CO, which relies only on DCS switches to interconnect various pieces of network elements. More specifically, this limitation means that a large number of DCS 3/3 ports are required to space-switch a signal operating at a rate higher than the DS3 rate. For example, 48 input and output DCS 3/3 ports are required to connect a single OC-48 link to other parts of the CO. Support for a plurality of such high-rate links can thus quickly lead to the utilisation of all ports on an existing DCS 3/3 space switch, which only comes in sizes larger than 1000 ports by 1000 ports at a great cost, and which does not come in sizes larger than 2000 ports by 2000 ports. Once all the ports on a space-switch are utilised, no further interconnections between links that converge at a CO are possible. This in turn imposes a limit on the amount of bandwidth that can flow through the CO.

Cascading DCS switches to form single higher-capacity space switches does not significantly alleviate this last problem, as no further increases in switching capacity are realised once more than a few DCS switches have been interconnected. More specifically, as the number of DCS switches comprising a single larger block of DCS switches increases, each additional DCS switch that is added to the block must set aside an increasing proportion of its ports just to communicate with the other DCS switches in the block, rather than to connect new network links into the CO. At some point, the addition of an additional DCS switch would fail to add any cross-connect switching capacity to the CO, as the additional DCS switch would have to allocate all of its ports just for communication with the other DCS switches that are already in the block. Therefore, even if deployed as interconnected groups, the use of DCS switches impose a limit on the total bandwidth that can be handled by a CO.

A solution to the problems created by the use of DCS switches is thus required. The use of electrically controlled optical signal cross-connect (OXC) switches, in which an output fibre carries the same light that entered the switch on an input fibre, could eventually be a complete solution to the problem of managing large amounts of bandwidth at large central offices. By switching signals in their optical forms, these switches avoid the signal conversion problems associated with DCS technology. Furthermore, because such a switch is capable of interconnecting links operating at any of the high-capacity SONET rates, it can also increase the bandwidth capacity of the CO.

At present however, problems with cross-talk, the lack of a memory function when processing optical signals, and a lack of reliability, are restricting the size of these OXC switches to 16 ports by 16 ports, and preventing them from being interconnected to form a larger switch. Furthermore, OXC switches are still very costly. Additionally, there are no known methods for performing several important bandwidth management services on optical signals, such as traffic grooming (e.g. the ability of intermediate nodes to split traffic coming from a common source to two separate destinations), time-slot interchanging (TSI), and performance monitoring and testing of paths, lines and sections, which are routinely performed on electrical signals. Therefore, an OXC switch by itself is not a desirable solution to the aforementioned bandwidth management problems at present.

The foregoing indicates that a solution in the manner in which bandwidth is managed at COs, is immediately required until the capabilities of OXC-switches can be expanded. Besides alleviating or mitigating some or all of the above-identified problems, this interim solution must also minimise the investment that must be made in soon-to-be obsolete switching technology.

One proposed interim solution to these problems, involves providing optical interfaces into a DCS switch. This would internalise much of the signal processing required to electrically switch signals that arrive at and leave from the CO in optical form, within the DCS switch. It also allows for a reduction in the number of cables required to connect network elements to the DCS switch. Moreover, since the DCS switch would still switch electrical signals, the CO would still be able to support a variety of bandwidth management services.

At present however, the highest available interfaces support only the OC-12 rate. DCS switches with OC-12 interfaces are also very costly.

Many high capacity transport nodes, such as SONET nodes, provide several standardised services that are also implemented on DCS switches. These include electrical space switching at the DS3 rate, time-slot assignment (hair-pinning), time-slot interchange (TSI), traffic grooming, and performance monitoring and testing of paths, lines and sections.

In well-provisioned networks, all the COs are connected in a full or partial mesh using redundant links for protection switching purposes. Such a mesh is said to implement an alternate path of restoration service, which provides contingency routes between COs in the event of a failure in the network.

SUMMARY OF THE INVENTION

It thus is an object of this invention to mitigate and/or alleviate one or all of the above-identified shortcomings, until affordable OXC switches are developed that have a great number of input and output ports. These and other objects are achieved through an improved architectural arrangement for managing large quantities of bandwidth in COs.

More specifically, these and other objects are achieved through an arrangement of communication network elements at a central office (CO) comprising a plurality of transport cards that terminate optical network links, a plurality of transport/switching nodes that each terminate at least one optical network link, host a subset of the transport cards so as to form subtended rings with each of the cards of such subset, and provide a space-switching function between each of its housed cards, and an intra-CO optical link that interconnects the transport/switching nodes so as to allow traffic to flow between any of the optical network links in the CO that are terminated by the transport cards or the transport/switching nodes.

Another aspect of this invention is a space-switching transport node for deployment in the central office (CO) environment, said switch being capable of terminating an OC-192 Synchronous Optical Network (SONET) link, said switch being adapted to additionally support time-slot interchange and alternate path of restoration services, and said switch housing SONET cards that implement the same functions as lower capacity SONET nodes such that it can space-switch traffic between such SONET cards.

BRIEF DESCRIPTION OF THE DRAWINGS

Embodiments of the invention will now be described with reference to the accompanying drawings, in which.

DETAILED DESCRIPTION OF THE PREFERRED EMBODIMENTS

Figure 1:
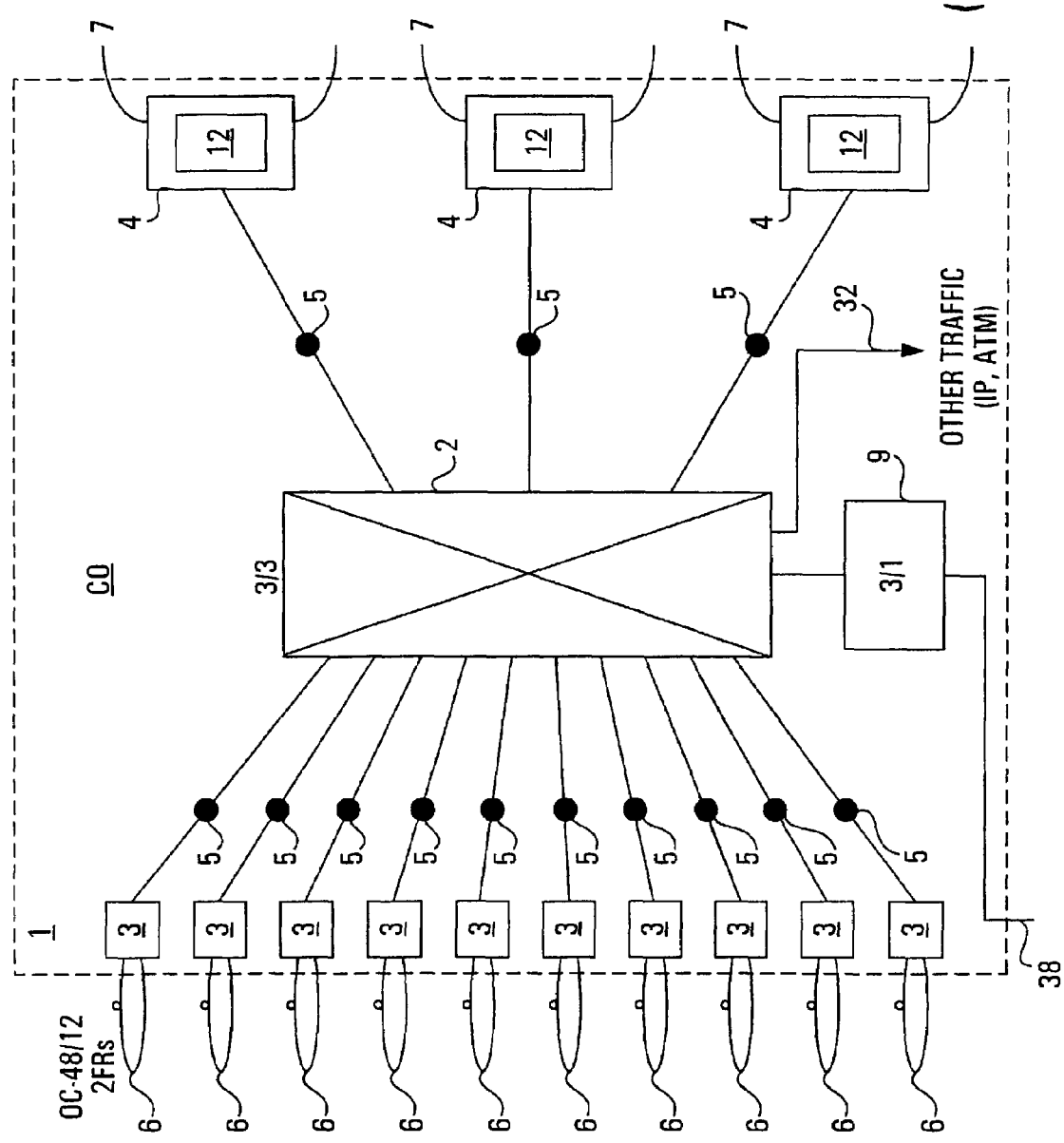
FIG. 1 illustrates a conventional arrangement of network elements deployed in a central office (CO)

Referring firstly to FIG. 1, a conventional arrangement of network elements deployed in a large central office (CO) 1 is shown. The arrangement includes high capacity Synchronous Optical Network (SONET) transport nodes 3, 4, for terminating SONET rings 6, 7 at the CO 1. The arrangement could also include wavelength division multiplexing (WDM) equipment.

Some of the SONET rings 6, 7 are express-rings 7 that handle traffic flowing between major urban centres, and which must therefore support interfaces for optical signals that conform with the higher rate SONET protocols such as OC-192. The transport nodes 4 terminating the express-rings, hereinafter referred to as express-ring transport nodes 4, are thus typically OC-192 nodes. It is to be noted that these express-ring transport nodes 4 contain a space-switching fabric described below with reference to FIG. 2.

The remainder of the SONET rings 6, 7 are collector-rings 6, which handle smaller traffic flows than the express-rings 7, and which typically support interfaces for optical signals that conform with the OC-12 or OC-48 protocols. Lower capacity SONET transport nodes 3 that connect SONET collector-rings 6 to the CO 1 are hereinafter referred to as collector-ring transport nodes 3. The collector-ring transport nodes 3 are typically OC-12 or OC-48 nodes.

Add/drop links 8, 32 which act as a source/sink for locally terminated traffic (i.e. lower-rate local traffic coming from or going to customer premises equipment (CPE)), and which carry only electric signals, can also feed into the CO 1. Much of the traffic flowing from the CO 1 to CPEs is demultiplexed into DS1 signals by a DS3-to-DS1 multiplexer/demultiplexer 9 before it exits the CO 1.

A digital signal cross-connect (DCS) switch 2 interconnects all the transport nodes 3, 4, add/drop links 32 and the multiplexer/demultiplexer 9. The DCS switch 2 also performs several important bandwidth management services, such as grooming, time-slot interchanging and performance monitoring.

Interfacing equipment 5 (e.g. a patch panel) is used as an interface between the low-rate, electrical signal ports (not shown) of the DCS switch 2 and the high-rate, optical signal ports (also not shown) of the transport nodes 3, 4. The interfacing equipment also multiplexes and demultiplexes traffic between the higher OC-12, OC-48 and OC-192 rates supported by the transport nodes 3, 4 and the lower DS3 and DS1 rates supported by the DCS switch 2.

It is to be noted that the inclusion of this interfacing equipment 5 in the CO 1 requires additional cabling, space and power. The inclusion of such equipment 5 also additionally complicates the management function within the CO 1.

Figure 2:
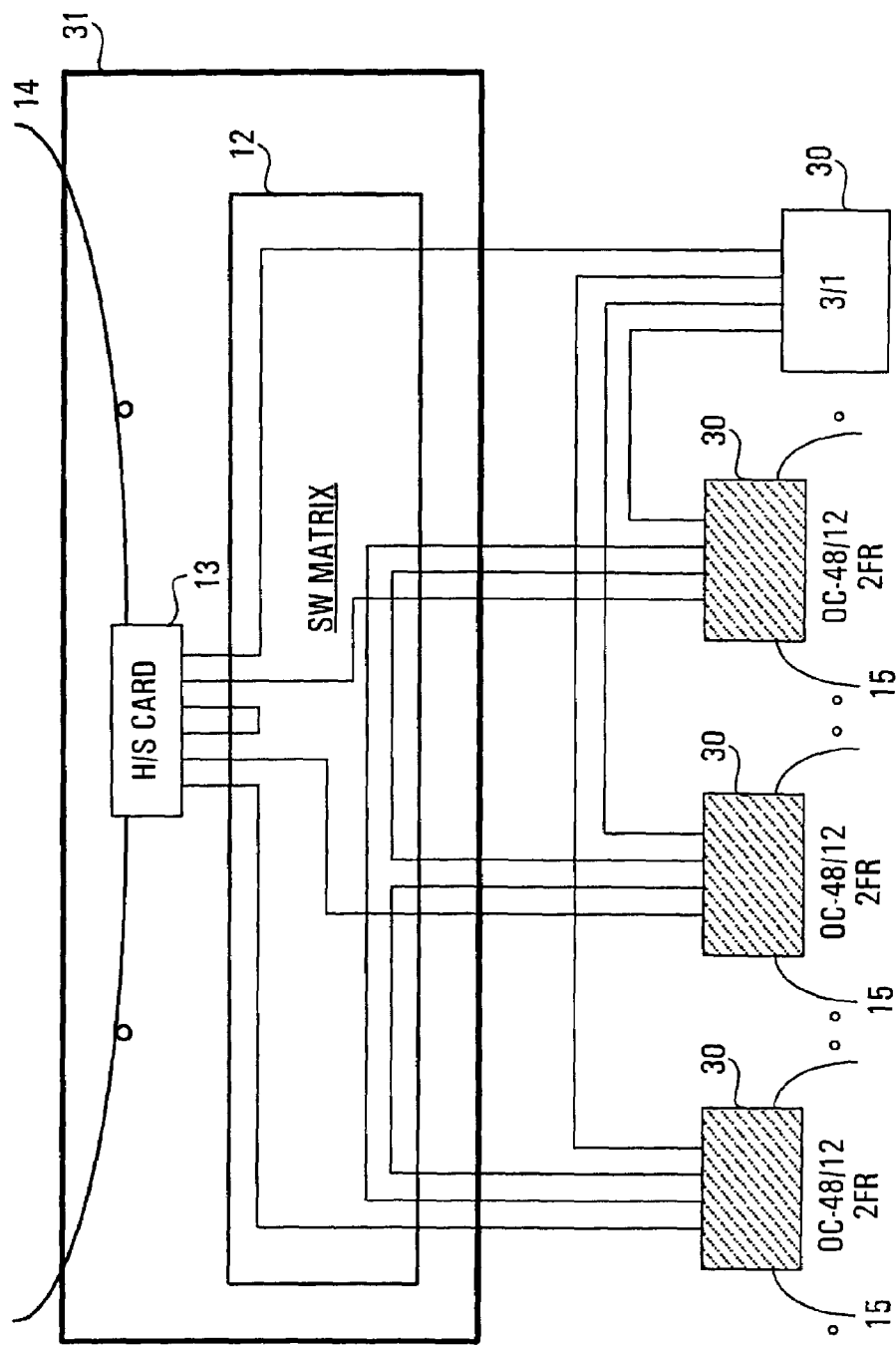
FIG. 2 illustrates an internal view of an express-ring transport node that is deployed in the transport environment.

FIG. 2 illustrates the role of the space-switching fabric 12 inside an express-ring transport node 31 like the nodes 4 of FIG. 1, when such a node 31 is deployed in the transport environment as opposed to the CO environment. In the transport environment, the express-ring transport nodes 31 often acts as interfaces between single express rings 14 and a plurality of collector-ring transport nodes 30 that terminate collector-rings 15. The space switching fabric 12 is included to implement required functions such as tributary hair-pinning when the express-ring transport node 31 is deployed in the transport environment. The size of the space-switching fabric 12 is at least 384×384 DS3 ports. Optical-to-electrical and electrical-to-optical conversion of signals takes place at the ingress and egress points of the fabric 12, within the express-ring switch 31. It is to be noted that in present CO environments such as the one of FIG. 1, where the express-ring transport nodes 4 only pass traffic emerging from the DCS switch 2 to and from the express rings 7, this space switching fabric 12 is under-utilized.

Figure 3:
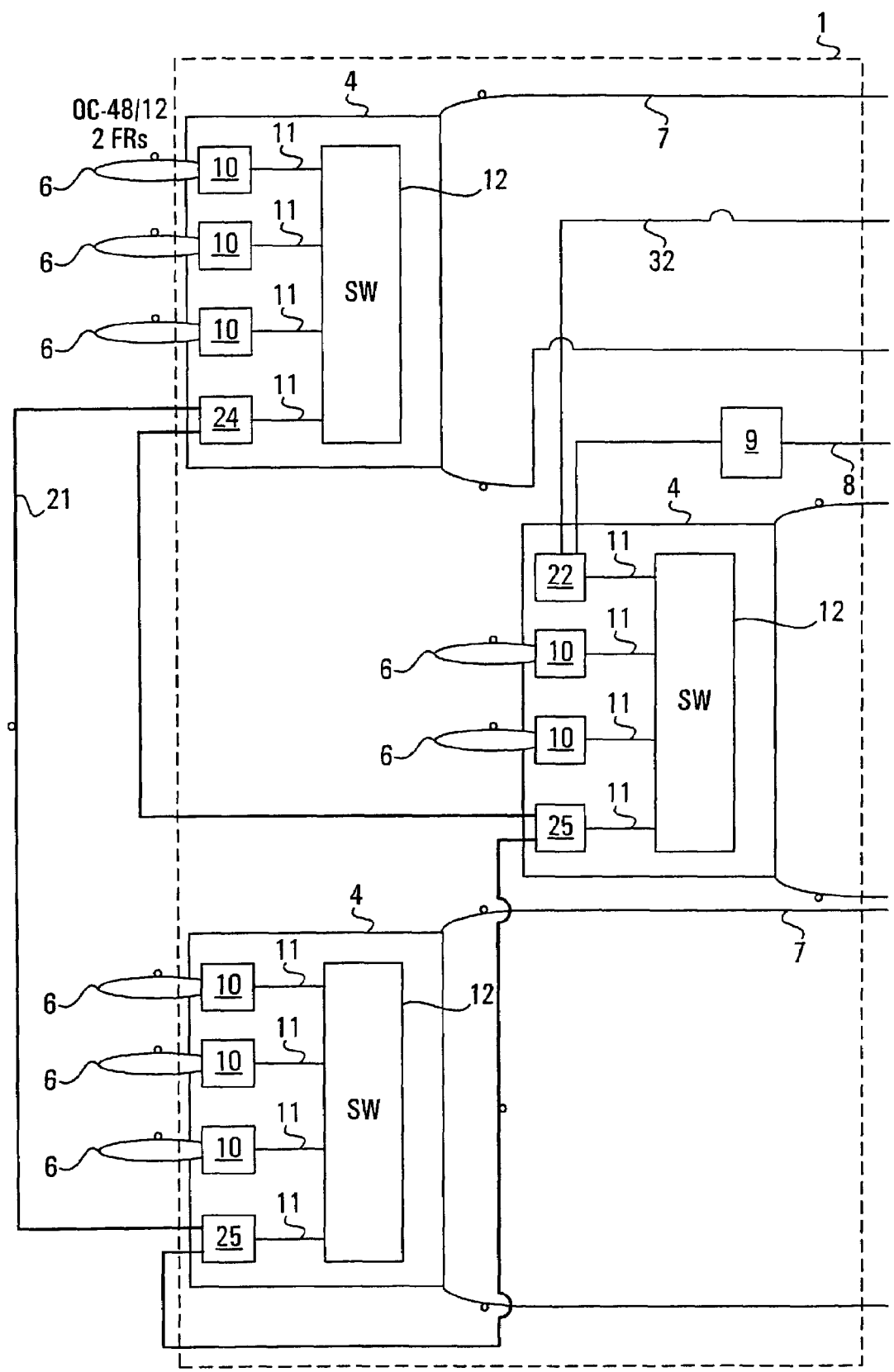
FIG. 3 illustrates an improved arrangement that is a preferred embodiment of this invention.

FIG. 3 illustrates an improved arrangement according to an embodiment of this invention. This new arrangement interconnects the same collector-rings 6 and express rings 7, makes use of the same express-ring transport nodes 4, and uses the same multiplexer/demultiplexer 9 as an interface to add/drop links 8, as the arrangement of FIG. 1. A difference between this arrangement and the arrangement of FIG. 1 is that the DCS switch 2 and the interfacing equipment 5 are not included in this arrangement. Another difference between this arrangement and the arrangement of FIG. 1, is that the functions carried out by the collector-ring transport nodes 3 are implemented by collector-ring cards 10 that are housed on the shelves (not shown) of the express-ring transport nodes 4. A single collector-ring card 10 that is inserted on the shelf of an express-ring node 4 forms a subtended SONET ring 11 with that node 4. Another difference is that at least one of the cards 10 housed on one of the express-ring nodes 4, serves as the add/drop card 22 and is used as a gateway for all add/drop traffic entering or leaving the CO 1. The add/drop card 22 passes traffic in electrical format directly to add/drop links 32, or passes traffic to the multiplexer/demultiplexer 9, which in turn leads to the add/drop links 8. Another difference, described just below, is the addition of an intra-CO SONET ring 21 that interconnects the express-ring nodes 4 in the CO 1.

It is to be noted that while the conventional arrangement of FIG. 1 relies on the DCS switch 2 to interconnect the various elements of the CO 1, the arrangement of FIG. 3 achieves the same function using the heretofore underutilized cross-connect switching fabric 12 of express ring nodes 4 deployed in the CO environment. This gives the express-ring transport nodes 4 a dual transport/switching function, making them transport/switching nodes 4. Traffic that must flow between rings that lead into two different transport/switching nodes 4 is exchanged between such transport/switching nodes 4 over the intra-CO ring 21. A collector-ring card 25, hereinafter an intra-CO ring interface card 25, is included in each transport/switching node 4 and used to place traffic on and remove traffic from the intra-CO ring 21. The intra-CO ring 21 is set up as a regular SONET ring within the CO, that is primarily distinguishable from SONET rings in the transport environment only by the relatively small distances covered by the former, and by the use of collector ring interface cards 10, as opposed to collector ring interface nodes 3, for terminating traffic.

Figure 4:
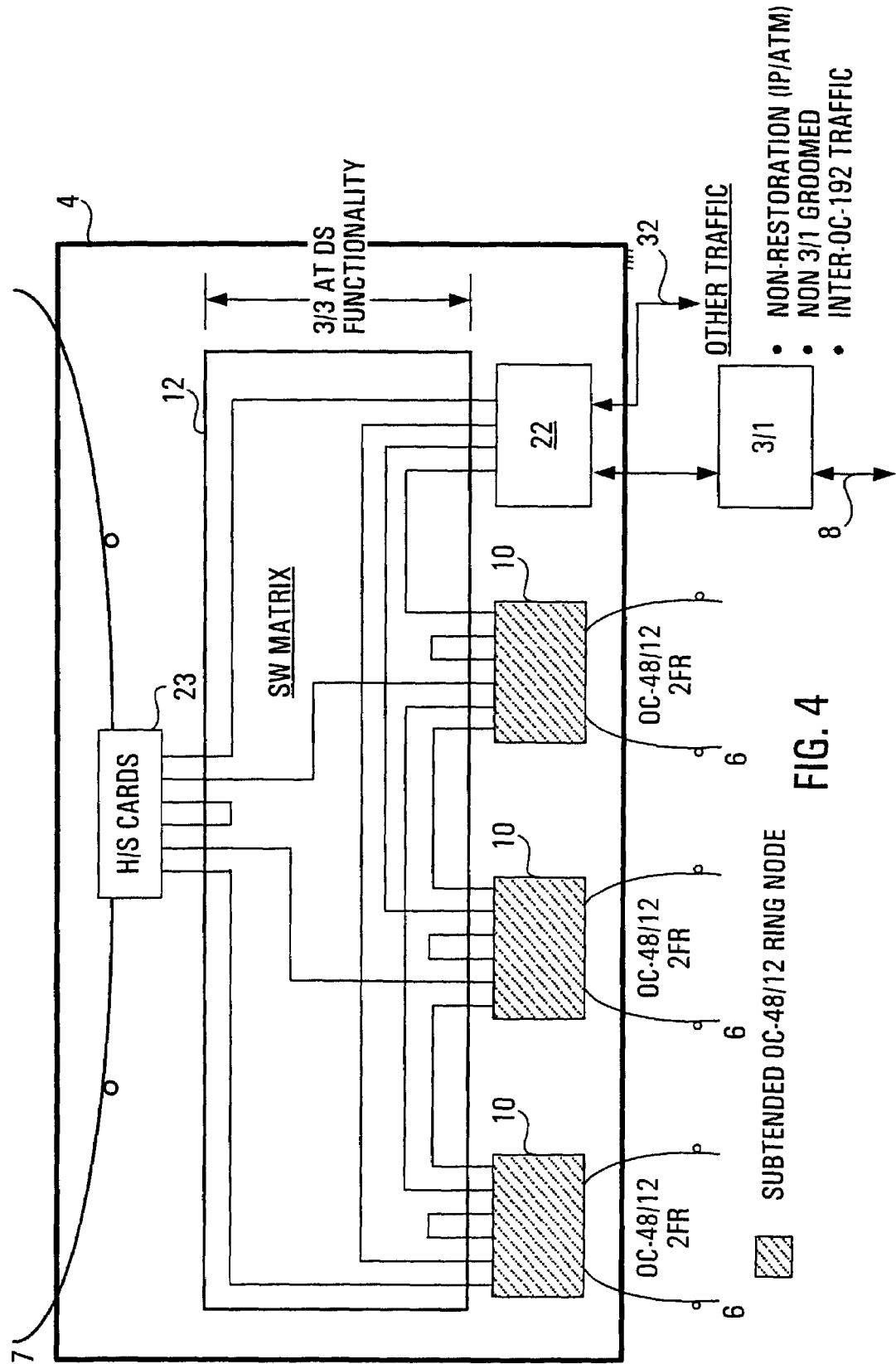
FIG. 4 illustrates an internal view of an OC-192 node that is shown in the arrangement of FIG. 3.

The usage of one of the switching fabrics 12 of FIG. 3 as a space-switch for connected transport cards 10, is illustrated in FIG. 4. FIG. 4 shows how the switching fabric 12 within one of the transport/switching nodes 4 is able to interconnect collector rings 6, express rings 7 and add/drop links 8, 32 to CPE sites, as done by the DCS switch 2 in the arrangement of FIG. 1. FIG. 4 also shows that a high-speed express-ring card 23 is required to interconnect the switching fabric 12 with the express ring 7. An intra-CO ring interface card 25 (not shown in FIG. 4) would also be required if more than one transport/switching node 4 were deployed in the CO 1.

A key advantage of the arrangement of FIG. 3 over the arrangement of FIG. 1 is its lower cost. The transport/switching node 4 of the arrangement of FIG. 3, with its 384 DS3 ports×384 DS3 ports switching fabric 12, provides the same cross-connect functions as the typical 500 DS3 ports× 500 DS3 ports switch 2 of the arrangement of FIG. 1, except for the slightly higher throughputs available on the latter. The transport/switching nodes 4 are however, far more inexpensive than the DCS switches 2. Moreover, only minor modifications of express-ring transport nodes 4 would be required for them to be converted into transport/switching nodes that assume the cross-connection switching role mandated by the arrangement of FIG. 3. More specifically, such transport/switching nodes 4 can be implemented by OC-192 nodes that are programmed by software to implement the following standard services that are available on present DCS switches:

cross-connections at the DS3 rate
time-slot assignment (also known as hair-pinning)
time-slot interchange
grooming
performance monitoring of paths, lines, sections and intermediate paths
alternate route of restoration As of the date of the filing of this application, to the applicant's knowledge, the only services from the above list that have not yet been implemented on OC-192 nodes are the time-slot interchange service and the intermediate path performance monitoring service. It will be appreciated by those skilled in the art that programming a transport node to support either of these services can be readily achieved using known techniques.

Another advantage of the novel arrangement of FIG. 3, is that it replaces risky investments in the expensive DCS switches with lower-risk investments in nodes that can be redeployed in the transport environment once they are no longer needed in the CO environment. It will be readily apparent to those skilled in the art that any programming to adapt a SONET node for deployment in the CO environment, being only a software change, can be readily undone so that the node can be deployed back in the transport environment at a later date, perhaps when OSX cross-connects can be economically deployed. Largely because much of the ingenuity of this invention lies in the inventive application of the built-in capabilities of the OC-192 to the CO environment, the cost and risk associated with implementing the arrangement of FIG. 3 is low.

It is to be noted that the above identified cost saving and risk-minimization are especially significant in light of the impending obsolescence of all electrical cross-connect switches.

Besides providing the same function as the DCS switch at a significantly lower cost and risk, the arrangement of FIG. 3 has other advantages over the arrangement of FIG. 1.

Because the subtended rings do not require any interfacing equipment 5, and because their use involves replacing collector-ring transport nodes with collector-ring cards, less space, less power and less cabling is required in the arrangement of FIG. 3 than the arrangement of FIG. 1.

Numerous modifications and variations of the present invention are possible in light of the above teachings. It is therefore to be understood that within the scope of the appended claims, the invention may be practiced otherwise than as specifically described herein. The arrangement of FIG. 3 can be varied for example, so that part of the collector ring interface function is implemented by collector-ring nodes 3 as in the arrangement of FIG. 1, and another part is implemented by collector-ring cards as in the arrangement of FIG. 3. Each of the novel arrangements described herein can also be varied to conform to a wavelength division multiplexing (WDM) protocol instead of SONET.

Figure 5:
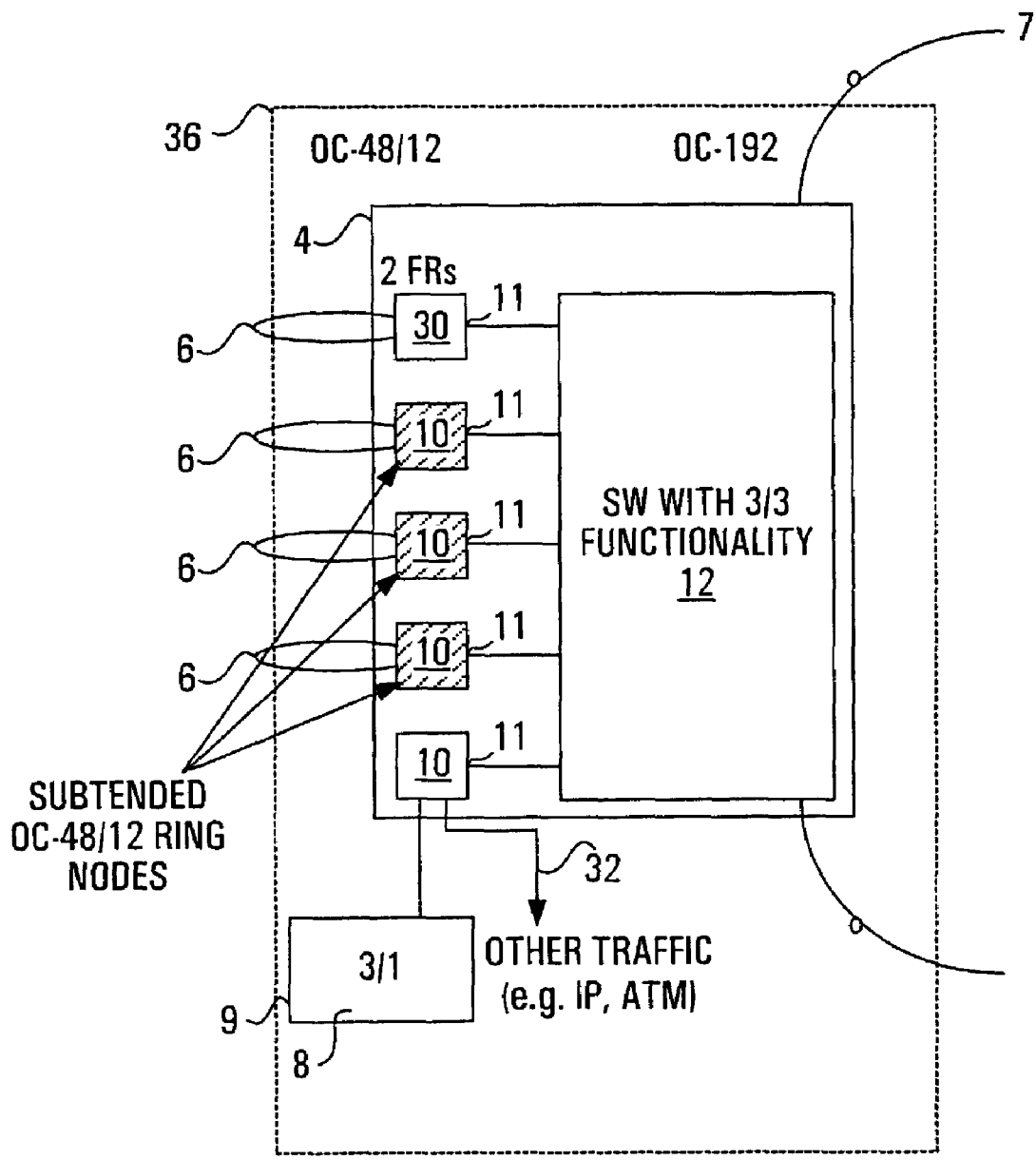
FIG. 5 illustrates an alternative arrangement to the arrangement of FIG. 3 for smaller COs.

The novel arrangement of FIG. 3 can be applied to COs of varying size. FIG. 5 illustrates the application of such an arrangement to a smaller CO 36. The elements making up the arrangement of FIG. 5 are all included in the arrangement of FIG. 3; the primary difference is that the FIG. 5 arrangement only requires a single transport/switching node 4 to carry out all the space-switching required by the CO 1.

Figure 6:
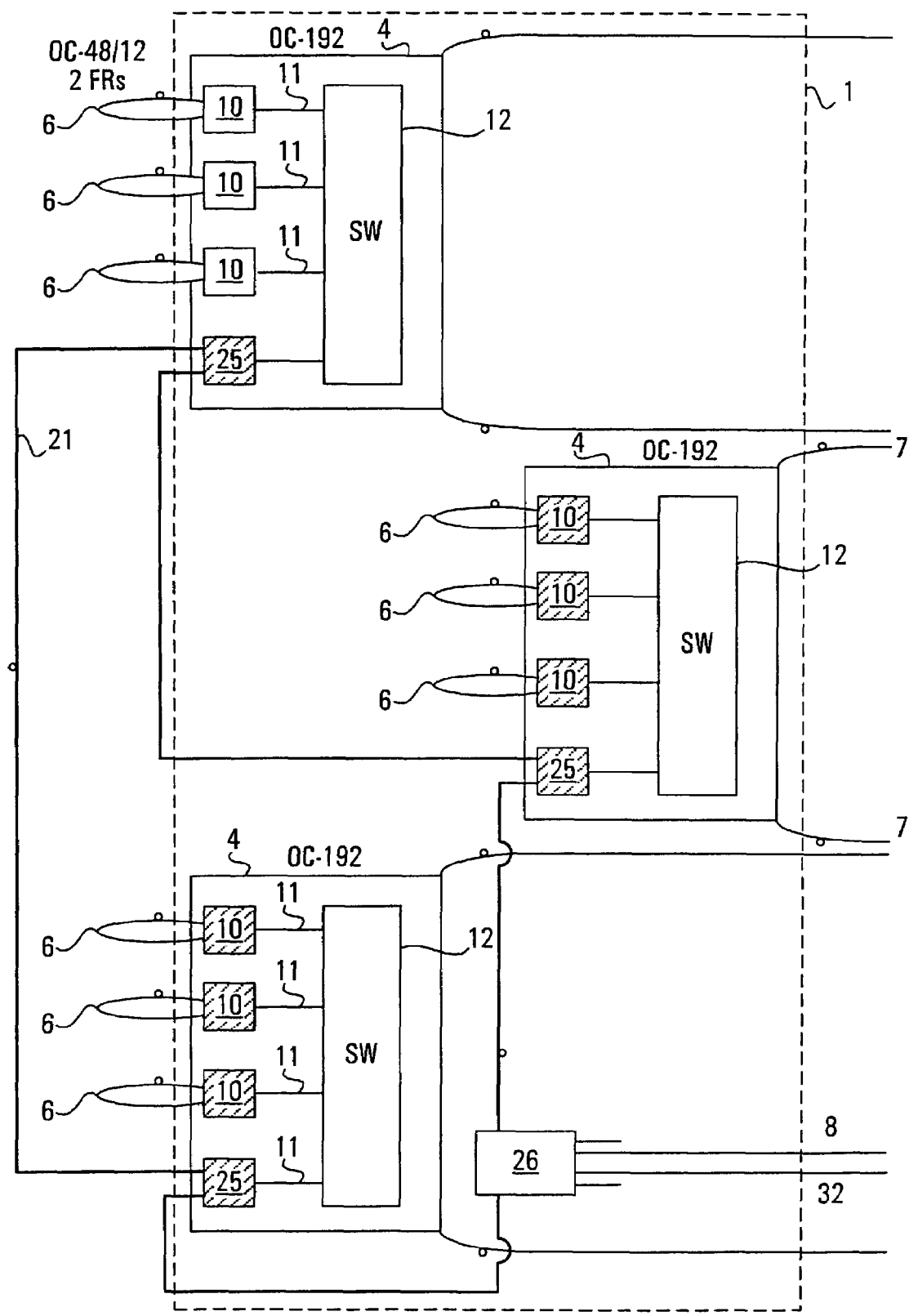
FIG. 6 illustrates a second alternative arrangement to the arrangement of FIG. 3 that routes add/drop traffic through an intra-CO SONET ring.

Another variant of this invention, which relates to how the add/drop traffic is handled, is illustrated by FIG. 6. The arrangement of FIG. 6 contains the same elements as the arrangement of FIG. 3, except for the substitution of a SONET drop shelf 26 (such as a DCS 3/1) for the multiplexer/demultiplexer 9 and the add/drop card 22. The SONET drop shelf 26 demultiplexes optical signals to lower rate electrical signals and vice versa, unlike the multiplexer/demultiplexer which handles only electrical signals. In the arrangement of FIG. 3 and FIG. 5, the multiplexer/demultiplexer 9 is interposed between the add/drop card 22 and the add/drop link 8, and the add/drop traffic being exchanged between the add/drop card 22 and the multiplexer/demultiplexer 9 is in electrical form. By contrast, in the arrangement of FIG. 6, the drop traffic coming from the collector-rings and express rings is passed through the intra-CO ring interface cards 25, passed through the intra-CO SONET ring 21, and then sent directly in optical form to the SONET drop shelf 26 that converts the traffic from a high rate optical form to a lower rate electrical form. The SONET drop shelf 26 thus accepts traffic from and sends traffic to the add/drop link 8. The use of this variant means there is no need to include the multiplexer/demultiplexer 9 or add/drop card 22, as the add/drop traffic is converted into lower rate signals suitable for the add/drop link 8 by the SONET drop shelf 26 alone.

We claim:

1. An arrangement of communication network elements at a central office (CO) comprising:
   a plurality of transport cards that terminate optical network links;
   a plurality of transport/switching nodes that each terminate at least one optical network link, host a subset of the transport cards so as to form subtended rings with each of the cards of such subset, each node including a switch fabric to provide a space-switching function between each of its housed cards;
   multiplexer/demultiplexer means for adding or dropping traffic and multiplexing/demultiplexing signals flowing between at least one of said switch fabrics and add/drop links; and
   an intra-CO optical link that interconnects the transport/switching nodes and said multiplexer/demultiplexer means so as to allow traffic to flow between any of the optical network links in the CO that are terminated by the transport cards or the transport/switching nodes.

2. The arrangement of claim 1 wherein the intra-CO optical link is implemented by a SONET ring.

3. The arrangement of claim 1 wherein the transport cards, the transport/switching nodes, the intra-CO optical link and the optical network links each implements parts of a wavelength division multiplexing (WDM) protocol.

4. An arrangement of communication network elements at a central office (CO) comprising:
   a plurality of transport cards that terminate optical network links;
   a plurality of transport/switching nodes that each terminate at least one optical network link, host a subset of the transport cards so as to form subtended rings with each of the cards of such subset, and provide a space-switching function between each of its housed cards;
   at least one of said transport/switching nodes including an additional transport card which serves as an add/drop card that terminates add/drop links; and
   a multiplexer/demultiplexer is interposed between the add/drop card and some or all of the add/drop links, such that the multiplexer/demultiplexer multiplexes/demultiplexes electrical signals flowing between the add/drop cards and the add/drop links.

5. The arrangement of claim 1 wherein said multiplexer/demultiplexer means comprises a drop-shelf connected to the intra-CO optical link, which carries out the necessary signal conversions required to convert traffic moving between the add/drop links and the intra-CO optical link.

6. The arrangement of claim 4 wherein the transport cards, the transport/switching nodes, the intra-CO optical link and the optical network links each implements parts of the Synchronous Optical Network (SONET) protocol suite.

7. The arrangement of claim 6 wherein the transport/switching node supports the OC-192 SONET protocol suite, and is modified by programming that additionally implements the time-slot interchange service and intermediate path monitoring service.

8. The arrangement of claim 6 wherein the transport cards support the OC-3, OC-12 and/or OC-48 SONET protocol suites.

9. The arrangement of claim 4 wherein a space-switching fabric inside the transport/switching node is used to provide the space-switching function.

10. A space-switching transport node for deployment in the central office (CO) environment, said node comprising:
    at least one express ring transport card being capable of terminating an OC-192 Synchronous Optical Network (SONET) link;
    an additional transport card which serves as an add/drop card that terminates add/drop links; and
    a multiplexer/demultiplexer interposed between the add/drop card and some or all of the add/drop links, such that the multiplexer/demultiplexer multiplexes/demultiplexes signals flowing between the add/drop cards and the add/drop links;
    said node being adapted to additionally support time-slot interchange and alternate path of restoration services, and said node housing collector ring transport cards that implement the same functions as lower capacity SONET nodes such that the node can space-switch traffic between the express ring transport card and the collector ring transport cards, and the add/drop card, and said node having an intra-CO optical link card being capable of connecting to other substantially similar transport nodes within the CO.

11. An arrangement of communication network elements at a central office (CO) comprising:
- a plurality of transport cards that terminate optical network links;
- a transport/switching nodes that terminates at least one optical network link, hosts the transport cards so as to form subtended rings with each of the cards, and include a switch fabric to provides a space-switching function between each of the cards; and
- multiplexer/demultiplexer means for adding or dropping traffic and multiplexing/demultiplexing signals flowing between at least one of said switch fabrics and add/drop links.

12. The arrangement of claim 11 wherein said multiplexer/demultiplexer means comprises a drop-shelf connected to said transport/switching node by an intra-CO optical link, said drop shelf carries out the necessary signal conversions required to convert traffic moving between the add/drop links and the intra-CO optical link.

13. The arrangement of claim 11 wherein said multiplexer/demultiplexer means comprises:
- an additional transport card added to the transport/switching node which serves as an add/drop card that terminates add/drop links; and
- a multiplexer/demultiplexer interposed between the add/drop card and some or all of the add/drop links, such that the multiplexer/demultiplexer multiplexes/demultiplexes electrical signals flowing between the add/drop cards and the add/drop links.

14. An arrangement of communication network elements at a central office (CO) comprising:
- a plurality of transport cards that terminate optical network links; and
- a transport/switching node that terminates at least one optical network link, hosts the transport cards so as to form subtended rings with each of the cards, and provides a space-switching function between each of the cards, said transport/switching node including an additional transport card which serves as an add/drop card that terminates add/drop links; and
- a multiplexer/demultiplexer is interposed between the add/drop card and some or all of the add/drop links, such that the multiplexer/demultiplexer multiplexes/demultiplexes electrical signals flowing between the add/drop cards and the add/drop links.

15. An arrangement of communication network elements at a Central Office (CO) comprising:
- a plurality of transport/switching nodes, each of the plurality of transport/switching nodes comprising an intra-CO optical link card, an express ring transport card, a plurality of collector ring transport cards, and a space-switching fabric, wherein the space-switching fabric is coupled to the intra-CO optical link card, the express ring transport card and to each of the plurality of collector ring transport cards, the space-switching fabric of each transport, switching node providing space switching between the respective plurality of collector ring cards, the respective express ring card and the respective intra-CO optical link card, and wherein the express ring transport card and each of the plurality of collector ring transport cards is connectable to a respective optical network ring; at least one of the transport/switching nodes including an additional transport card which serves as an add/drop card that terminates add/drop links;
- at least one intra-CO optical link that interconnects the plurality of transport/switching nodes via the respective intra-CO optical link card belonging to each transport/switching node, so as to allow traffic to flow between any of the plurality of transport switching nodes in the CO; and
- a multiplexer/demultiplexer interposed between the add/drop card and some or all of the add/drop links, such that the multiplexer/demultiplexer multiplexes/demultiplexes signals flowing between the add/drop cards and the add/drop links.

16. The arrangement of communication network according to claim 15;
- wherein each transport/switching node supports the CO-192 SONET protocol primarily on its respective express ring transport card, and is modified by programming that additionally implements a time-slot interchange service in intermediate path monitoring service.

17. An arrangement of communication elements at a Central Office (CO) comprising:
- a plurality of SONET transport nodes each having a switching fabric and a respective plurality of transport cards comprising at least one express ring transport card and at least one collector ring transport card and an intra-CO optical link card, each transport node connected to an express ring via the at least one express ring transport card, at least one of the at least two collector ring transport cards of the transport node connected to collector rings; at least one of the SONET transport nodes including an additional transport card which serves as an add/drop card that terminates add/drop links;
- a multiplexer/demultiplexer interposed between the add/drop card and some or all of the add/drop links, such that the multiplexer/demultiplexer multiplexes/demultiplexes signals flowing between the add/drop cards and the add/drop links; and
- at least one intra-CO optical link, each of which interconnects a respective pair of the transport nodes via the respective intra-CO optical link cards belonging to the respective pair of the transport nodes;
- wherein switch fabric of each OC-192 transport node provides space switching between the collector ring transport cards and the express ring transport card.

* * * * *